United States Patent
Kobunaya

[11] Patent Number: 6,006,270
[45] Date of Patent: Dec. 21, 1999

[54] COMMUNICATION SYSTEM WITH TIME STAMP CONTROLLER FOR REGULATING DATATRANSMISSION RATE

[75] Inventor: Hideki Kobunaya, Tokyo, Japan

[73] Assignee: NEC Corporation, Tokyo, Japan

[21] Appl. No.: 08/896,959

[22] Filed: Jul. 18, 1997

[30] Foreign Application Priority Data

Jul. 18, 1996 [JP] Japan ................................. 8-189478

[51] Int. Cl.[6] .............................. H04J 3/24; H04L 12/56; H04Q 11/04
[52] U.S. Cl. .......................... 709/233; 709/251; 709/253; 709/250; 370/231; 370/232; 370/252; 370/253
[58] Field of Search ........................ 395/200.63, 200.81, 395/200.83, 880; 370/231, 232, 234, 252, 253, 395; 709/233, 251, 253, 250

[56] References Cited

U.S. PATENT DOCUMENTS

| | | | |
|---|---|---|---|
| 4,748,620 | 5/1988 | Adelmann et al. | 370/394 |
| 4,894,823 | 1/1990 | Adelmann et al. | 370/252 |
| 5,260,978 | 11/1993 | Fleischer et al. | 375/354 |
| 5,313,454 | 5/1994 | Bustini et al. | 370/231 |
| 5,446,726 | 8/1995 | Rostoker et al. | 370/232 |
| 5,467,342 | 11/1995 | Logston et al. | 370/253 |
| 5,475,681 | 12/1995 | White et al. | 370/349 |
| 5,477,541 | 12/1995 | White et al. | 370/392 |
| 5,535,193 | 7/1996 | Zhang et al. | 370/253 |
| 5,590,116 | 12/1996 | Zhang | 370/253 |
| 5,608,731 | 3/1997 | Upp et al. | 370/516 |
| 5,633,859 | 5/1997 | Jain et al. | 370/234 |
| 5,777,984 | 7/1998 | Gun et al. | 370/230 |
| 5,812,527 | 9/1998 | Kline et al. | 370/232 |

FOREIGN PATENT DOCUMENTS

| | | |
|---|---|---|
| 1-166644 | 6/1989 | Japan . |
| 2-170645 | 7/1990 | Japan . |

OTHER PUBLICATIONS

"Bt8230 ATM Segmentation and Reassembly Controller—ATM SAR", Brooktree Corp., pp. 32–36.

Primary Examiner—Zarni Maung
Assistant Examiner—William D. Thomson
Attorney, Agent, or Firm—Foley & Lardner

[57] ABSTRACT

A communication controller transfers data cells and a control data cell representative of a target transmission rate from a system memory to a host; however, when a bus between the system memory and the communication controller is congested, the actual transmission rate for the data cells becomes smaller than the target transmission rate; a time stamp generator produces a time stamp representative of time for requesting a data transfer from the system memory, and a time stamp monitor compares the time stamp with actual stating time of transmission of the data cell to the host so as to check whether the target transmission rate is appropriate or not; if the target transmission rate is too large, the time stamp monitor requests a data processor to change the target transmission rate so that the data cells are transferred to the host at an appropriate transmission rate at all times.

8 Claims, 7 Drawing Sheets

COMMUNICATION SYSTEM WITH TIME STAMP CONTROLLER FOR REGULATING DATATRANSMISSION RATE

FIELD OF THE INVENTION

This invention relates to a communication system and, more particularly, to a communication system equipped with a transmission controller operative to minimize the difference between an allowable transmission rate and an actual transmission rate.

DESCRIPTION OF THE RELATED ART

FIG. 1 illustrates a prior art communication system used as a terminal incorporated in ATM (Asynchronous Transfer Mode)-LAN (Local-Area-Network). A transmission controller 1 comprises transmission FIFO (First-In-First-Out) 1a, a DMA (Direct-Memory-Access) controller 1b, a command supplier 1c, a data processor 1d for calculating a transmission rate, a receiver 1e and a control cell generator 1f.

The DMA controller 1b and a PCI (Peripheral Component Interconnect) bridge 2a are connected to a PCI bus 2b, and the DMA controller 1b and the PCI bridge 2a serve as a PCI agent. A system memory 2c is connected through a CPU (Central-Processing-Unit) local bus 2d to the PCI bridge 2a. An arbiter 2e is provided for the DMA controller 1b, and manages a data communication through the DMA controller 1b. A physical layer LSI (Large-Scale-Integration) 3a is connected between the communication controller 1 and a channel 3b, and sends cell data from the communication controller 1 to the channel 3b. The channel 3b is connected at the other end to a node 3c, and other channels 3d are also connected to the node 3c.

FIG. 2 illustrates cells stored in the transmission FIFO. A control cell is stored in an address ADD1, and data cells 1, 2 and 3 are stored from address ADD2 to address ADD4. FIG. 3 shows an example of the format for the control cell. The control cell is constituted by a cell header 3c-1 and a cell payload 3c-2. A CI (Congestion Indication) bit 3c-3 representative of overcrowding, an ER (Explicit Rate) data 3c-5 representative of a transmission rate requested by the channel 3b and a CCR (Current Cell Rate) data 3c-4 representative of a current transmission rate are incorporated in the cell payload 3c-2.

The prior art communication controller 1 behaves as follows. When a control cell CC1 for data receiving arrive at the receiver 1e, the receiver 1e decodes the control cell CC1, and produces a request RQT1 for rate change on the basis of the CI bit and the ER data incorporated in the control cell CC1. The request RQT1 for rate change relates to the virtual channel on the channel 3b through which the control cell CC1 was transmitted to the receiver 1e.

The request RQT1 is supplied from the receiver 1e to a data processor 1d. The data processor 1d is responsive to the request RQT1 for rate change, and calculates an appropriate transmission rate to be applied to the virtual channel on the channel 3b.

The data processor 1d supplies the new transmission rate TR1 to the control cell generator 1f, and the control cell generator 1f produces a control cell CC2 for a data transmission through the channel 3b. The control cell CC2 has the CI bit of "0" representative of non-congestion status, the CCR data 3c-4 representative of the new transmission rate and the ER data 3c-5 representative of a peak cell rate. The control cell CC2 is written into the address ADD1 of the transmission FIFO 1a.

The data processor 1d further supplies a request RQT2 for data transmission to the command supplier 1c. When the request RQT2 for data transmission arrives at the command supplier 1c, the command supplier 1c sends a request RQT3 for direct memory access to the DMA controller 1b. The DMA controller 1b sends a bus request RQT4 to the arbiter 2e. The arbiter 2e checks the internal memory thereof to see whether the PCI bus is busy or not. If the PCI bus 2b is available for the data transfer to be requested, the arbiter 2e supplies a grant GNT to the DMA controller 1b. Then, the DMA controller 1b requests the PCI bridge 2a to transfer the data from the system memory 2c to the CPU local bus 2d, and prepares a data cell to be transferred to the DMA controller 1b. When the set of data or a data cell is prepared in the PCI bridge 2a, the PCI bridge 2a supplies a ready signal RDY to the DMA controller 1b. Data cells CD are transferred from the PCI bridge 2a to the DMA controller 1b, which in turn transfers the data cells CD to the transmission FIFO. In this way, the data cells CD are sequentially stored in the transmission FIFO 1a. However, if the CPU local bus 2b is busy, the PCI bridge 2a consumes a long time to gather the set of data, and the DMA controller 1b can not immediately write the data cell into the transmission FIFO 1a.

The control cell CC2 and the data cells CD are transferred from the transmission FIFO 1a to the physical layer LSI 3a, and the physical layer LSI 3a supplies them to the channel 3b.

As described hereinbefore, a plurality of channels 3b and 3d are connected to the node 3c, and the node manages these channels 3b/3d on the basis of the transmission rates represented by the CCR data of the control cells and the status of the buffers incorporated therein. If one of the channels 3b/3d is congested, the node 3c changes the CI bit of a control cell to "1", and changes the ER data to a smaller value to be allowed. The control cell returns to a communication controller associated with the congestion channel.

The prior art communication system encounters a problem in that the communication controller 1 transfers the data cells at a transmission rate much smaller than the transmission rate calculated by the data processor 1d. This is because of the fact that the PCI bridge 2a can not transfer the data cell to the DMA controller 1b during the busy status of the CPU bus 2d. If an actual transmission rate is small and the channel is not congested, the transmission rate is increased to the peak rate, because the node 3c has supplied the control cell representative of the non-congestion status of the channel. In this situation, the actual transmission rate is widely different from the transmission rate calculated by the data processor 1d.

SUMMARY OF THE INVENTION

It is therefore an important object of the present invention to provide a communication system, which changes a transmission ratio depending upon bus status.

To accomplish the object, the present invention proposes to decrease a transmission rate when time delay is serious.

In accordance with the present invention, there is provided a communication system for transferring data cells together with a control cell, comprising: a memory subsystem including a data storage for storing data information and a bus for transferring a data cell produced from pieces of the data information therethrough; a destination receiving a first control cell representative of a target transmission rate and the data cell through a channel, and supplying a second control cell containing a piece of control information regarding a change of the target transmission rate; and a communication controller including a data transferring section connected to the bus, having a first temporary storage for storing the first control cell and the data cell supplied from the memory sub-system in response to a first request and transferring the first control cell and the data cell from the first temporary storage through the channel to the destination at an actual transmission rate at first time, a monitoring section having a second temporary storage for storing a time stamp representative of second time of generating the first request and checking the time stamp to see whether or not the target transmission rate is appropriate, the monitoring section producing a second request representative of a change of the target transmission rate when the target transmission rate is inappropriate, and a calculating section responsive to the second control cell for calculating the target transmission rate and supplying the first request to the data transferring section and the monitoring section and the first control cell to the first temporary storage, the calculating section further responsive to the second request for changing the target transmission rate.

BRIEF DESCRIPTION OF THE DRAWINGS

The features and advantages of the communication system will be more clearly understood from the following description taken in conjunction with the accompanying drawings, in which.

DESCRIPTION OF THE PREFERRED EMBODIMENTS

First Embodiment

Figure 4:
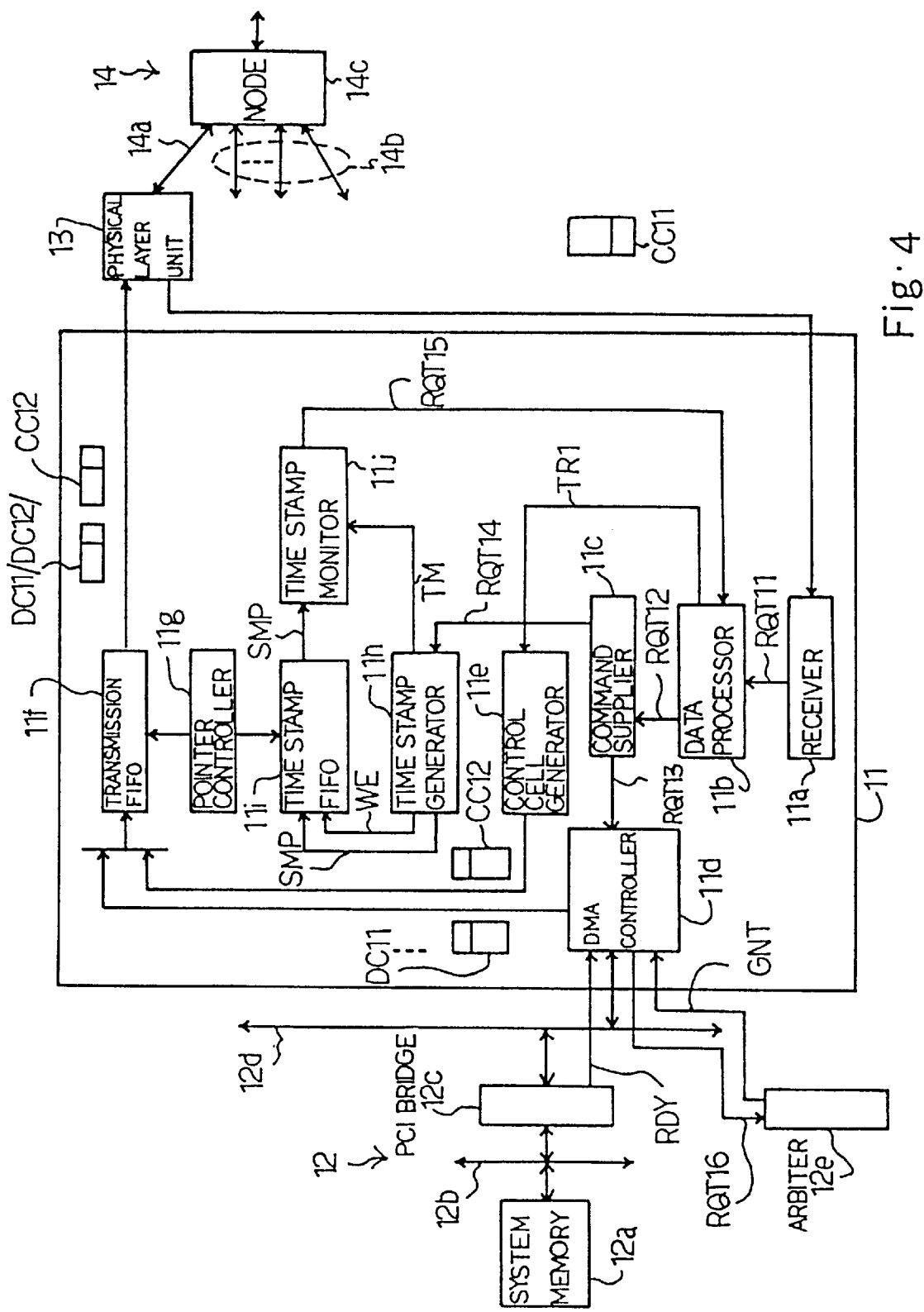
FIG. 4 is a block diagram showing a communication system according to the present invention.

Referring to FIG. 4 of the drawings, a communication system embodying the present invention largely comprises a communication controller 11, a memory sub-system 12 associated with the communication controller 11, a physical layer unit 13 and a host 14 connected through a channel 14a to the physical layer unit 13. Although a plurality of communication controllers 11 are further connected through channels 14b to the host 14, they are not shown in FIG. 4 for the sake of simplicity.

The communication controller 11 includes a receiver 11a, a data processor 11b connected to the receiver 11a, a command supplier 11c connected to the data processor 11b and a DMA controller 11d. When a control cell CC11 arrives at the receiver 11a, the receiver 11a generates a request RQT11 for rate change, and the request RQT11 is supplied to the data processor 11b. The data processor is responsive to the request RQT11, and calculates a transmission rate for a data transmission to the host 14. When the transmission rate is determined, the data processor 11b supplies a request RQT12 for data transmission. The command supplier 11c generates a request RQT13 for direct memory access, and supplies the request RQT13 to the DMA controller 11d. The DMA controller 11d requests the memory sub-system 12 to transfer data cells, and receives them from the memory sub-system 12.

Figure 1:
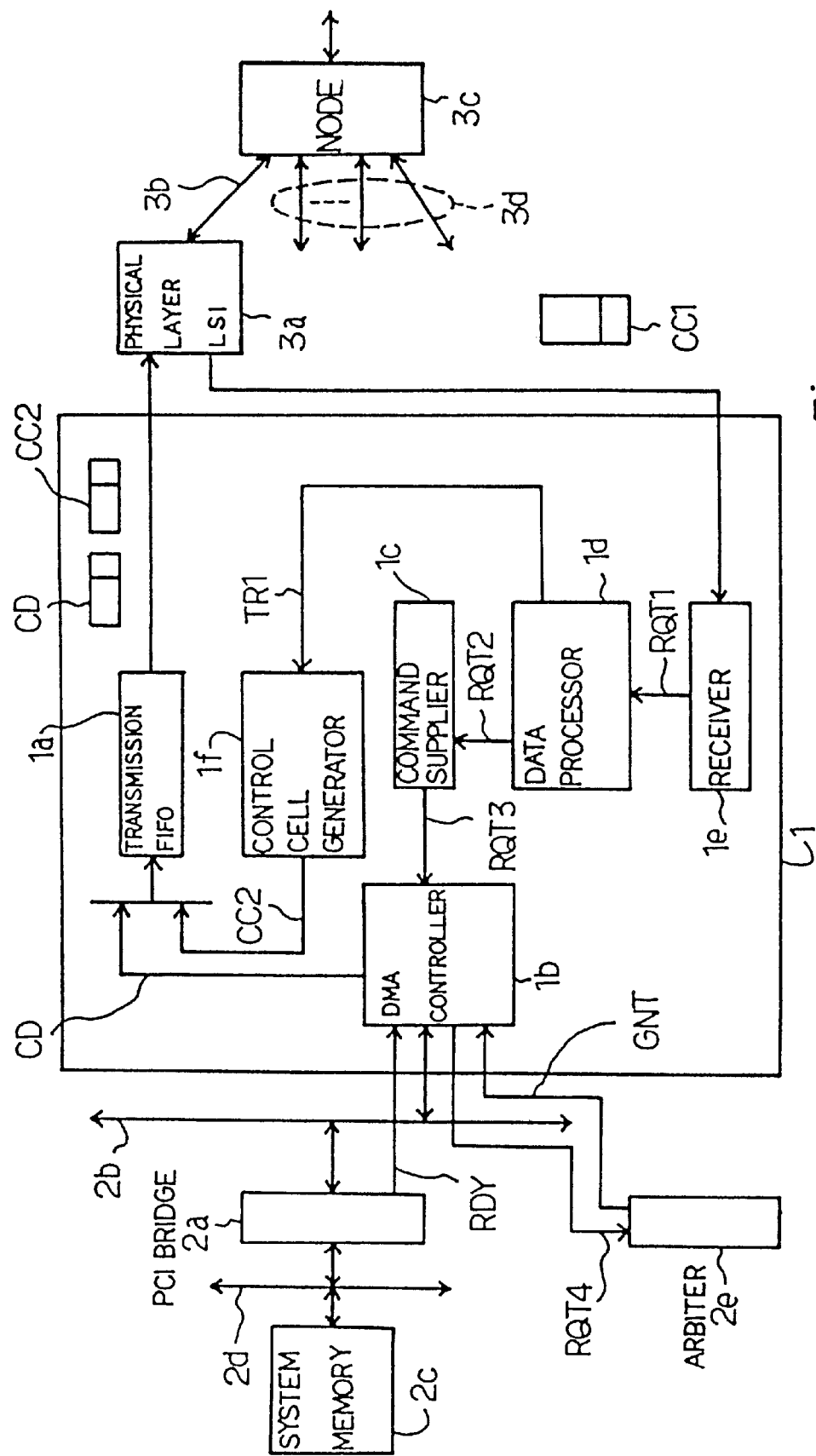
FIG. 1 is a block diagram showing the prior art communication system.
Figure 2:
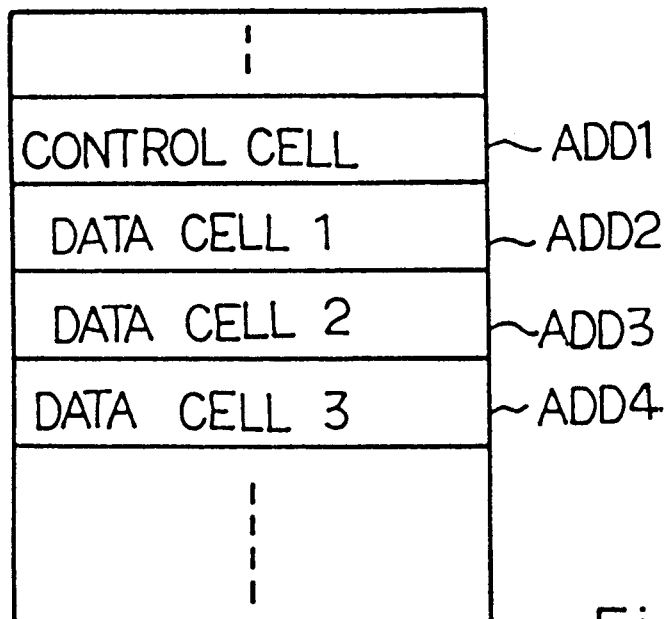
FIG. 2 is a view showing the control cell and the data cells stored in the transmission FIFO.
Figure 3:
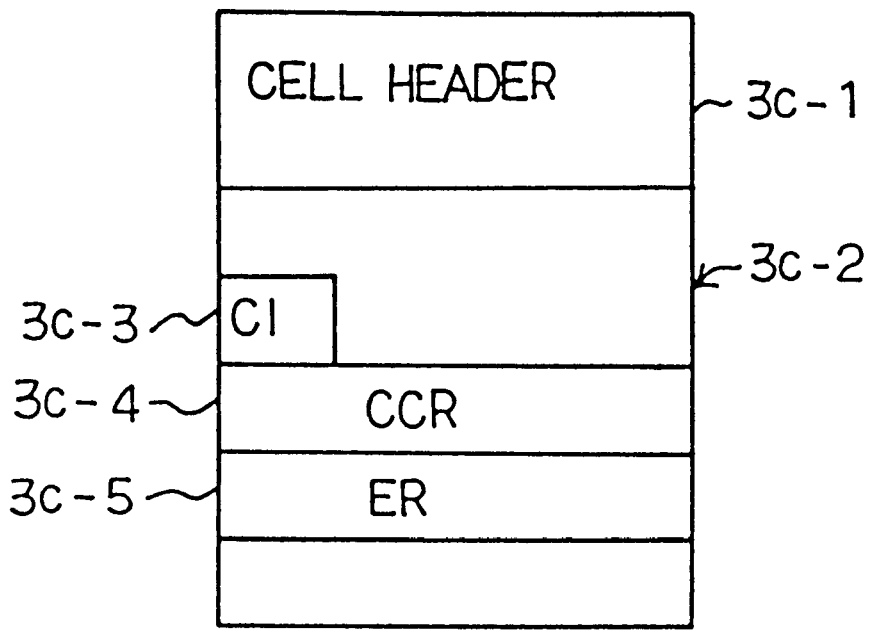
FIG. 3 is a view showing the format of the control cell.
Figure 5:
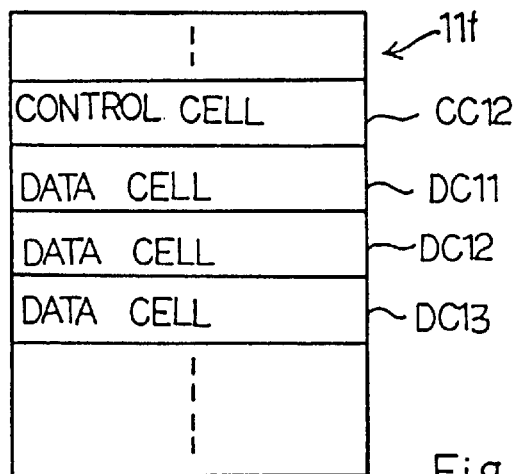
FIG. 5 is a view showing a control cell and the data cells stored in a transmission FIFO incorporated in the communication system.

The communication controller 11 further includes a control cell generator 11e connected to the data processor 11b, a transmission FIFO 11f connected between the DMA controller/control cell generator 11d/11e and the physical layer unit 13 and a pointer controller 11g connected to the transmission FIFO 11f. The transmission rate TR1 is supplied from the data processor 11b to the control cell generator 11e, and generates a control cell CC12 containing the transmission rate TR1. The control cell CC12 is formatted as similar to the control cells CC1/CC2 shown in FIG. 3. The control cell CC12 is supplied to the transmission FIFO 11f, and the data cells DC11, DC12, DC13 . . . are transferred through the DMA controller 11d to the transmission FIFO 11f. The control cell CC12 and the data cells DC11, DC12, DC13, . . . are stored in the transmission FIFO 11f as shown in FIG. 5. The transmission FIFO 11f are sequentially read out from the transmission on FIFO 11f, and are supplied to the physical layer unit 13 under the control of the pointer controller 11g.

Figure 6:
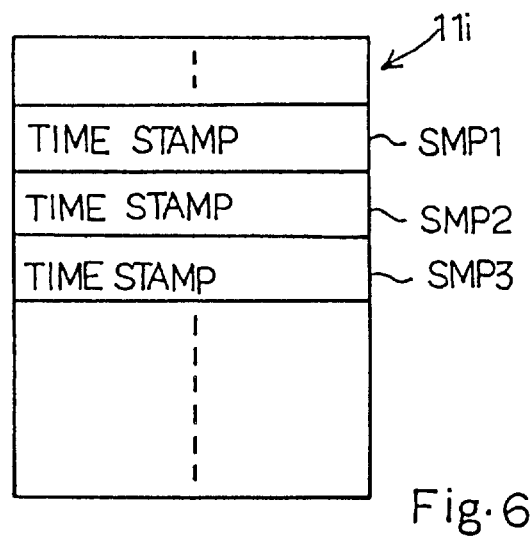
FIG. 6 is a view showing time stamps stored in a time stamp FIFO incorporated in the communication system.

The communication controller 11 further includes a time stamp generator 11h connected to the command supplier 11c, a time stamp FIFO 11i connected to the time stamp generator 11h and the pointer controller 11g and a time stamp monitor 11j connected between the time stamp FIFO 11i and the data processor 11b. The command supplier 11c generates a request RQT14 for time stamping, and supplies the request RQT14 to the time stamp generator 11h. The time stamp generator 11h is responsive to the request RQT14 for generating a time stamp SMP, and supplies the time stamp SMP and a write control signal WE to the time stamp FIFO 11i. The time stamp SMP is stored in the time stamp FIFO 11i. The command supplier 11c supplies the request RQT14 in synchronism with the request RQT13, and the time stamps SMP1, SMP2, SMP3, . . . are stacked in the time stamp FIFO 11i as shown in FIG. 6. The time stamp generator 11h further supplies current time TM to the time stamp monitor 11j. The time stamp SMP is read out from the time stamp FIFO 11i under the control of the pointer controller 11g, and is supplied to the time stamp monitor 11j. The time stamp monitor 11i compares the time stamp SMP with the current time TM, and decides whether the transmission rate is to be decreased or not. If the transmission rate is too fast, the time stamp monitor 11j generates a request RQT15 for decreasing the transmission rate. The request RQT15 is supplied to the data processor 11b.

Figure 7:
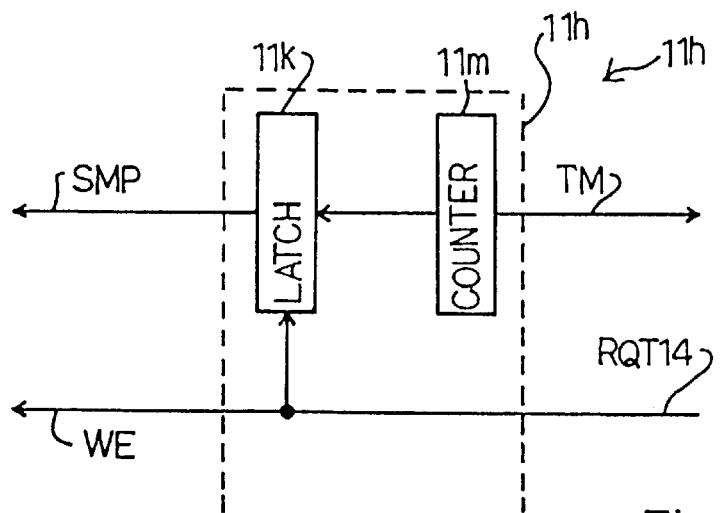
FIG. 7 is a block diagram showing a time stamp generator incorporated in the communication system.

FIG. 7 illustrates the circuit arrangement of the time stamp generator 11h. A latch circuit 11k and a counter 11m form the time stamp generator 11h. The counter 11m successively increases the current time TM, and supplies the current time TM to the time stamp monitor 11j and the latch circuit 11k. The latch circuit 11k is responsive to the request RQT14 so as to store the current time TM therein. The current time TM stored in the latch circuit 11k is supplied to the time stamp FIFO as the time stamp SMP, and the request RQT14 is transferred to the time stamp FIFO 11*i* as the write control signal WE.

Figure 8:
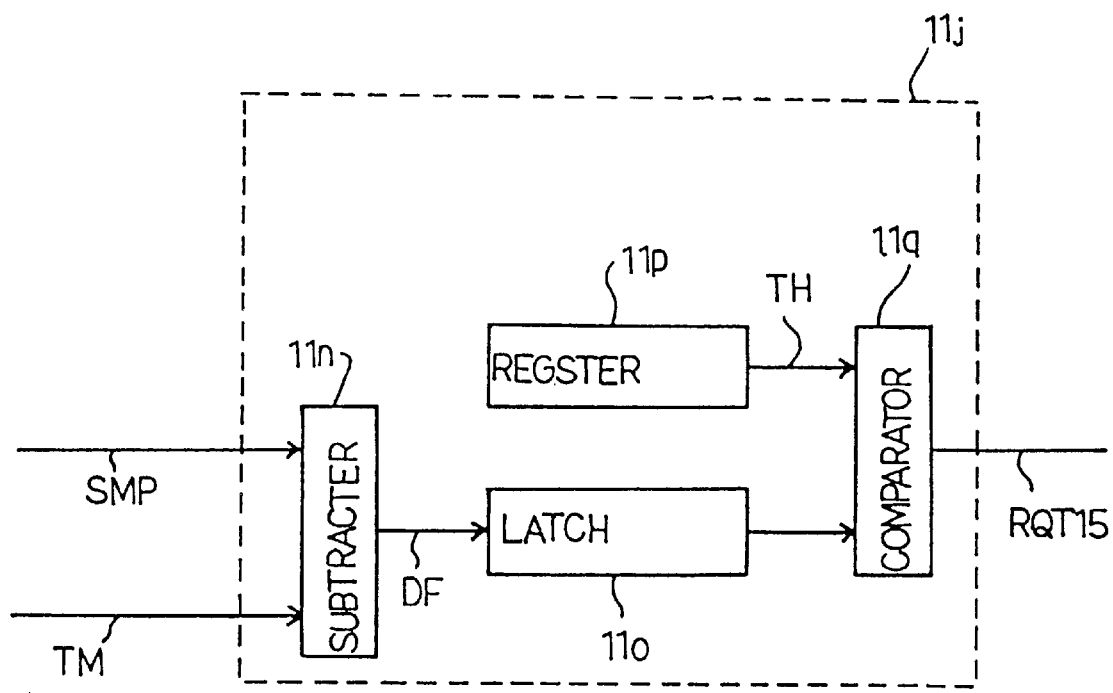
FIG. 8 is a block diagram showing a time stamp monitor incorporated in the communication system.

Referring now to FIG. 8, the time stamp monitor 11*j* includes a subtracter 11*n* connected to the time stamp FIFO 11*i* and the counter 11*m*, a latch circuit 11*o* connected to the subtracter 11*n*, a register 11*p* for storing a threshold TH and a comparator 11*q* connected to the latch circuit 11*o* and the register 11*p*. When the time stamp SMP is read out from the time stamp FIFO 11*i*, the subtracter 11*n* calculates a difference DF between the time stamp SMP and the current time TM, and the difference DF is temporarily stored in the latch circuit 11*o*. The comparator 11*q* compares the difference stored in the latch circuit 11*o* with the threshold TH stored in the register 11*o*. If the difference DF is less than the threshold TH, the comparator 11*q* does not supply the request RQT15 to the data processor 11*b*. However, if the difference DF is equal to or greater than the threshold TH, the comparator produces the request RQT15 for decreasing the transmission rate, and supplies the request RQT15 to the data processor 11*b*.

It is possible to estimate a time interval between the request RQT13 for direct memory access and the read-out of the data cell from the transmission FIFO 11*f* under the open status of the CPU local bus 12*b* and the PCI bus 12*d*. The threshold TH is determined on the basis of the time interval, and is stored in the register 11*p*.

Turning back to FIG. 4, the memory sub-system 12 includes a system memory 12*a* for storing the data cells DC11, DC12, DC13, . . . , a CPU local bus 12*b* connected to the system memory 12*b*, a PCI bridge 12*c* connected between the CPU bus 12*b* and a PCI bus 12*d* and an arbiter 12*e* connected to the DMA controller 11*d*. The memory sub-system 12 behaves as similar to that of the prior art communication system.

The host 14 includes a node 14*c*, and the channels 14*a* and 14*b* are connected to the node 14*c*. The node 14*c* is similar to that of the prior art communication system, and no further description is incorporated hereinbelow.

Assuming now that the node 14*c* supplies the control cell CC11 to the receiver 11*a*, the receiver 11*a* decodes the control cell CC11, and generates the request RQT11 for rate change on the basis of the CI bit and the ER data. The receiver 11*a* supplies the request RQT11 to the data processor 11*b*. The data processor 11*b* is responsive to the request RQT11 so as to calculate a new transmission rate for the virtual channel on the channel 14*a*.

Upon completion of the calculation, the data processor 11*b* supplies the request RQT12 for data transmission and the new transmission rate TR1 to the command supplier 11*c* and the control cell generator 11*e*, respectively.

When the command supplier 11*e* acknowledges the request RQT12, the command supplier 11*e* generates the request RQT13 for direct memory access and the request RQT14 for time stamping, and supplies the requests RQT13 and RQT14 to the DMA controller 11*d* and the time stamp generator 11*h*, respectively.

The latch circuit 11*k* stores the current time TM there in response to the request RQT14 for time stamping, and supplies the time stamp SMP to the time stamp FIFO 11*i*. The time stamp FIFO 11*i* is responsive to the write control signal WE so as to store the time stamp SMP therein.

On the other hand, the DMA controller 11*d* sends a bus request RQT16 to the arbiter 12*e*. The arbiter 12*e* checks current status of the PCI bus 12*d* to see whether or not the DMA controller 11*d* can use it. If the PCI bus is not busy, the arbiter 12*e* sends a grant GNT to the DMA controller 11*d*, and the DMA controller 11*d* requests the PCI bridge 12*c* to send a set of data cell or the data cell DC11.

The PCI bridge 12*c* reads out the data from the system memory 12*a* through the CPU local bus 12*b* so as to prepare the data cell DC11. When the set of data is prepared, the PCI bridge 12*c* sends a ready signal RDY to the DMA controller 11*d*, and the data cell DC11 is transferred from the PCI bridge 12*c* through the DMA controller 11*d* to the transmission FIFO 11*f*. However, if the CPU local bus is occupied by another system component, the PCI bridge 12*c* has to wait, and the data cell DC11 is transferred to the DMA controller 11*d* after the PCI local bus 12*b* becomes open.

In this way, the data cells DC11, DC12, DC13 are stored in the data transmission FIF0 11*f*, and the time stamps SMP1, SMP2, SMP3, . . . are accumulated in the time stamp FIFO 11*i*. The data cells DC11, DC12, DC13 , . . . are corresponding to the time stamps SMP1, SMP2, SMP3, . . . , respectively, and the data cells DC11, DC12, DC13, . . . are respectively paired with the time stamps SMP1, SMP2, SMP3 . . . .

Subsequently, the data cells DC11, DC12, DC13, . . . are sequentially transferred to the physical layer unit 13. When each data cell is read out from the transmission FIFO 11*f*, the pointer controller 11*g* increments the reader pointer of the time stamp FIFO 11*i*, and the data cells and time stamps DC11/SMP1, DC12/SMP2, DC13/SMP3, . . . are supplied to the physical layer unit 13 and the time stamp monitor 11*j*, respectively.

The time stamp monitor 11*j* calcuates the difference DF between the time stamp SMP and the current time TM, and compares the difference DF with the threshold TH. When the difference DF is less than the threshold TH, the time stamp monitor 11*j* does not generate the request RQT15, because the PCI bridge 12*c* appropriately supplies the data cells to the DMA controller 11*d*. However, if the difference DF is equal to or greater than the threshold TH, the time stamp monitor 11*j* supplies the request RQT15 to the data processor 11*c*, and the data processor 11*b* decreases the transmission rate. The data processor 11*b* informs the control cell generator 11*e* of the new transmission rate, and the control cell generator 11*e* rate into the transmission FIFO 11*f*.

In this instance, the physical layer unit 13 and the host 14 as a whole constitute a destination. The data transferring section is implemented by a combination of the DMA controller 11*d*, the transmission FIFO 11*f* and the pointer controller 11*g*, and the receiver 11*a*, the data processor 11*b*, the command supplier 11*c* and the control cell generator 11*e* form in combination a calculating section. The time stamp generator 11*h*, the time stamp FIFO 11*i*, the pointer controller 11*g* and the time stamp monitor 11*j* serve as a monitoring section. The requests RQT13 and RQT14 are corresponding to a first request, and the request RQT15 serves as a second request.

As will be appreciated from the foregoing description, when the data cell is delayed due to the busy status of the CPU local bus 12*b* or the PCI bus 12*d*, the communication controller 11 decreases the transmission rate, and the data cells are transferred through the physical layer unit 13 to the node 14*c* at an appropriate transmission rate at all times.

Second Embodiment

Figure 9:
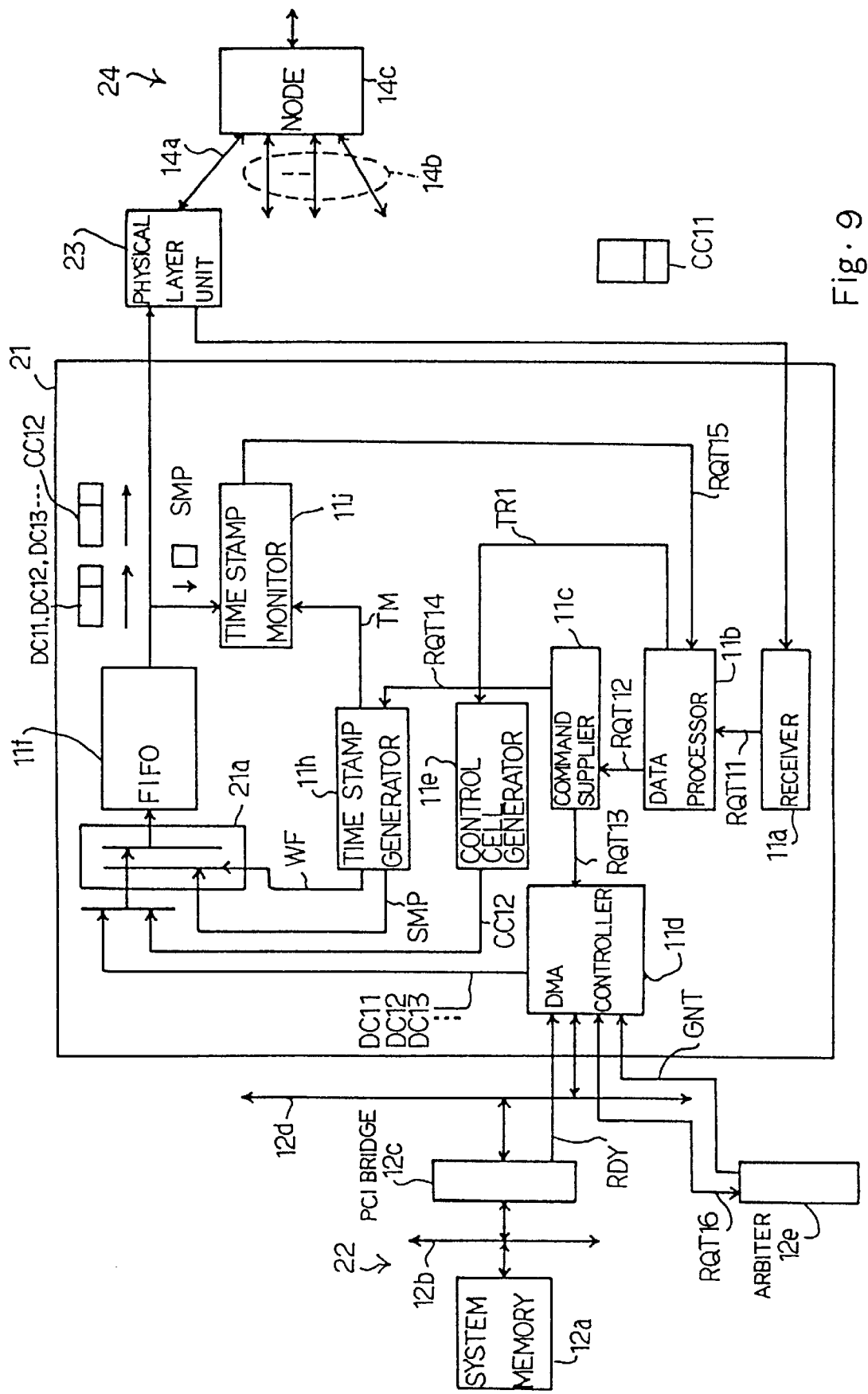
FIG. 9 is a block diagram showing the arrangement of another communication system according to the present invention.

Turning to FIG. 9 of the drawings, another communication system embodying the present invention also comprises a communication controller 21, a memory sub-system 22, a physical layer unit 23 and a host 24. The memory sub-system 22, the physical layer unit 23 and the host 24 are similar to those of the first embodiment, and the system components are labeled with the same references designating corresponding components of the first embodiment.

The communication controller 21 is similar to the communication controller 11 except a selector 21*a*. The time stamp FIFO 11i and the pointer controller 11g are replaced with the selector 21a. The other components of the communication controller 21 are labeled with the same references designating corresponding components of the communication controller 11 without detailed description.

Figure 10:
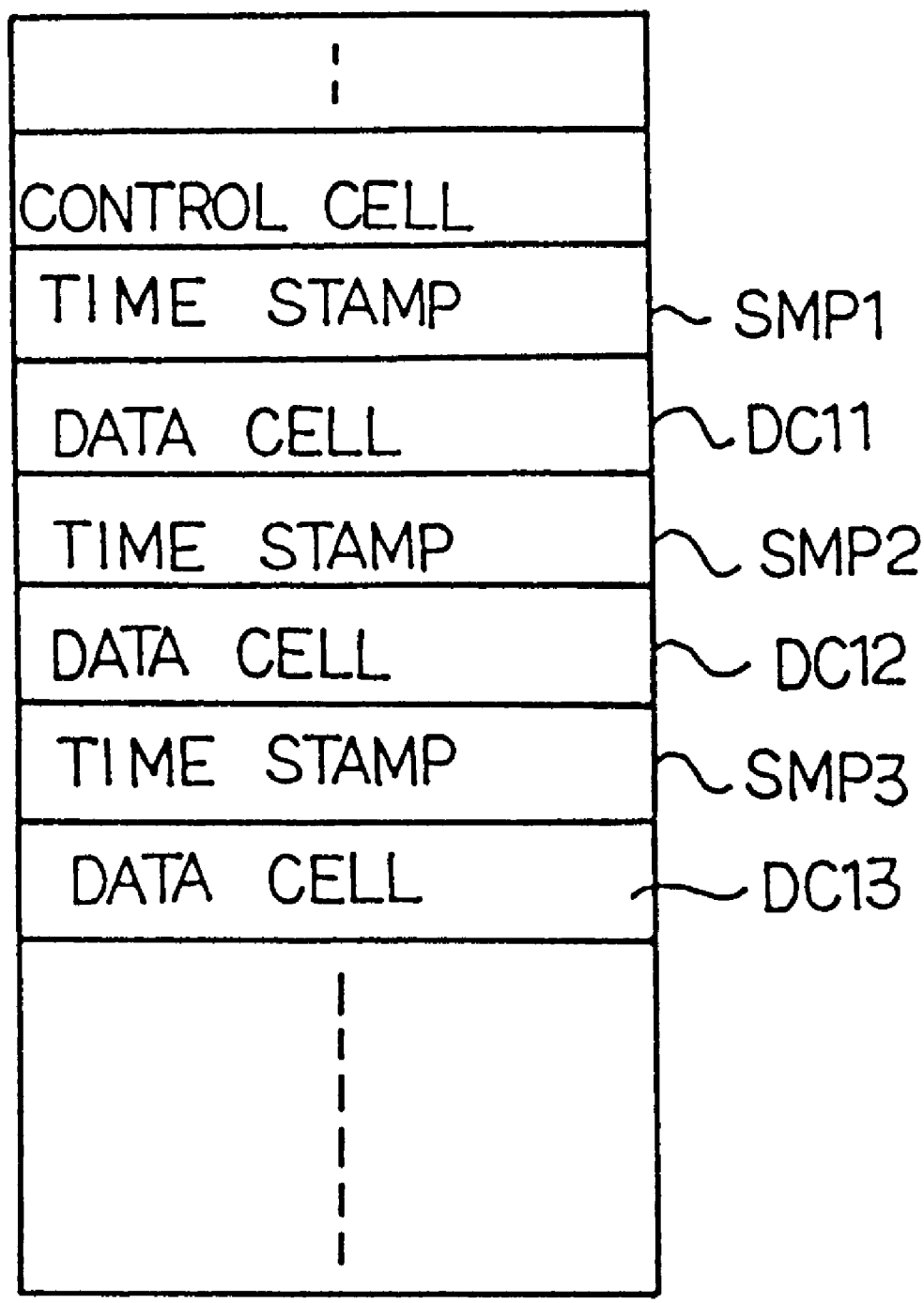
FIG. 10 is a view showing a control cell, time stamps and data cells stored in a transmission FIFO incorporated in the communication system.

The selector 21a is responsive to the write control signal WE so as to transfer the time stamp SMP to the FIFO 11f. The data cells DC11, DC12, DC13 . . . are supplied to the selector 21a, and the data cells DC11, DC12, DC13 . . . are alternated with the time stamps SMP1, SMP2, SMP3 . . . as shown in FIG. 10.

The communication system implementing the second embodiment transfers the data cells as follows. The receiver 11a, the data processor 11b and the control cell generator 11e behave as similar to those of first embodiment.

The command supplier 11c requests the DMA controller 11d to transfers a data cell to the selector 21a, and requests the time stamp generator 11h to supply the time stamp SMP to the selector 21a. The time stamp generator 11h immediately generates the time stamp SMP1, and supplies the time stamp SMP1 and the write control signal WE to the selector 21a. The selector 21a transfers the time stamp SMP1, and the time stamp SMP1 is accumulated in the FIFO 11f.

The DMA controller 11d transfers the data cell DC11 to the selector 21a, and the data cell DC11 is written into the FIFO 11f after the time stamp SMP1. In this way, the time stamps SMP1, SMP2, SMP3 and the data cells DC11, DC12, DC13 . . . are alternately stored in the FIFO 11f.

While the data cells DC11, DC12, DC13 . . . are being transferred to the physical layer unit 23, the time stamps SMP1, SMP2, SMP3 . . . are read out from the FIFO 11f prior to the data cells DC11, DC12, DC13 . . . , respectively, and are compared with the current time to see whether the difference between the time stamp and the current time TM is larger than the threshold stored in the time stamp monitor 11j. If the difference is equal to or greater than the threshold, the time stamp monitor 11j notices that the CPU local bus 12b and/or the PCI bus 12c is congested, and time stamp monitor 11j sends the request RQT15 for decreasing the transmission rate to the data processor 11b as similar to the first embodiment.

Thus, the communication controller 21 transfers the data cells to the physical layer unit 23 at a transmission rate close to the transmission rate represented by the control cell CC12. In this instance, the FIFO 11f is shared between the data cells and the time stamps, and the communication controller 21 is integrated on a small semiconductor chip.

Although particular embodiments of the present invention have been shown and described, it will be obvious to those skilled in the art that various changes and modifications may be made without departing from the spirit and scope of the present invention.

What is claimed is:

1. A communication system for transferring data cells together with a control cell, comprising:
   a memory sub-system including a data storage for storing data information and a bus for transferring a data cell produced from said data information therethrough;
   a destination receiving a first control cell representative of a target transmission rate and said data cell through a channel, and supplying a second control cell containing control information regarding a change of said target transmission rate; and
   a communication controller including
      a data transferring section connection to said bus, having a first temporary storage for storing said first control cell and said data cell supplied from said memory sub-system in response to a first request and transferring said first control cell and said data cell from said first temporary storage through said channel to said destination at an actual transmission rate at a first time,
      a monitoring section having a second temporary storage for storing a time stamp representative of a second time of generating said first request and analyzing said time stamp to determine whether or not said target transmission rate is appropriate, said monitoring section producing a second request representative of a change of said target transmission rate when said target transmission rate is inappropriate, and
      a calculating section responsive to said second control cell for calculating said target transmission rate and supplying said first request to said data transferring section and said monitoring section and said first control cell to said first temporary storage, said calculating section further responsive to said second request for changing said target transmission rate,
   wherein said monitoring section determines that the target transmission rate is inappropriate when a time interval between said first time and said second time is longer than a threshold time interval value stored therein.

2. The communication system as set forth in claim 1, wherein said monitoring section further includes:
   a time stamp generator generating a current time signal representative of current time periodically incremented, responsive to said first request for generating said time stamp and a write control signal and supplying said time stamp to said second temporary storage together with said write control signal, thereby causing said second temporary storage to store said time stamp,
   a pointer controller connected to said first temporary storage and said second temporary storage and reading out said data cell and said time stamp respectively from said first temporary storage and said second temporary storage in synchronism with each other, and
   a time stamp monitor connected to said second temporary storage and said time stamp generator, storing said threshold time interval value and calculating a difference between said second time and said current time indicating said first time so as to compare said difference with said threshold time interval value, said time stamp monitor supplying said second request to said calculating section.

3. The communication system as set forth in claim 1, wherein a first-in first-out memory is shared between said first temporary storage and said second temporary storage.

4. The communication system as set forth in claim 1, wherein the target transmission rate is changed based on congestion in data transfer between the memory sub-system and the communication controller.

5. The communication system as set forth in claim 3, wherein said first-in first-out memory stores data cells and time stamps in an interleaved manner, and wherein only said stored data cells are output to the destination.

6. A method for transferring data cells and control cells in a communication system, the method comprising:
   receiving, by a communication controller of one node connected to at least one other node in the communication system, a first control cell which includes congestion information with respect to a channel connecting the one node to the at least one other node;

generating, by the communication controller, a request for a data rate change based on the congestion information;

determining, by a data processor within the communication controller, a data transmission rate based on the request for the data rate change;

outputting, by the data processor, a request for data transmission;

based on the request for data transmission, outputting a direct memory access request to a direct memory access (DMA) controller that provides data transfer between a memory sub-system of the one node and the communication controller of the one node, the DMA request being a request for at least one data cell;

outputting, at a same time that the DMA request is outputted, a request for time stamping;

based on the request for time stamping, outputting a time stamp value indicative of a time when the request for time stamping was received;

based on the DMA request, attempting to obtain the at least one data cell via at least one internal bus connecting the communication controller and the memory sub-system, wherein the attempting includes outputting a request to a bus arbiter for control of the at least one internal bus;

obtaining, by a transmission FIFO of the communication controller, the at least one data cell from the memory sub-system by way of the DMA controller, and providing a signal indicative of when the at least one data cell was received by the transmission FIFO;

based on the signal indicative of when the at least one data cell was received, determining a current time value and outputting a current time signal indicative thereof;

comparing the current time signal to the time stamp value and determining if a difference is greater than a preset threshold time interval value; and if the difference is greater than the preset threshold time interval value, decreasing the data transmission rate, and if the difference is not greater than the preset threshold time interval value, maintaining the data transmission rate, wherein the data transmission rate is determined to be inappropriate and thereby is decreased when the difference is greater than the preset threshold time interval value.

7. The method as set forth in claim 6, wherein the data transmission rate is changed based on congestion in data transfer between the memory sub-system and the communication controller.

8. The method as set forth in claim 6, wherein the preset threshold time interval value is a value corresponding to an estimated time for a normal transfer of one data cell from the memory sub-system to the communications controller.

\* \* \* \* \*